United States Patent Office 2,964,493
Patented Dec. 13, 1960

2,964,493
STABILIZING HALOGENATED COPOLYMERS BY ADDING THE STABILIZERS BEFORE COMPOUNDING AND CURING THE COPOLYMERS

Thomas H. Hakala, Union, and John J. Laffey, Elizabeth, N.J., assignors to Esso Research and Engineering Company, a corporation of Delaware No Drawing. Filed Feb. 26, 1957, Ser. No. 642,372

9 Claims. (Cl. 260—45.8)

This invention relates to the stabilization of rubbery polymeric compositions containing partially halogenated copolymers of isoolefins and multiolefins, particularly chlorinated or brominated butyl rubber with minor proportions of certain organic nitrogen-containing compounds containing

groups, or compounds which under halogenated copolymer recovery conditions liberate

group in situ.

In accordance with the present invention, it has now been found that while isoolefin-multiolefin copolymers such as butyl rubber do not respond to stabilization by certain organic compounds containing

groups or compounds which under copolymer recovery conditions liberate

groups in situ, the halogenated derivatives of these copolymers are surprisingly improved by these stabilizing compounds as to decreased gelation as exemplified by good hexane solubility and particularly as to resistance to dehydrohalogenation as exemplified by low corrosion of tinplate.

Copolymers of the general type hereinbefore mentioned comprise a major proportion (preferably about 85 to 99.5%) of a $C_4$ to $C_8$ isoolefin such as isobutylene, 2-methyl-butene-1 or 3-methyl butene-1, etc., with a minor proportion (preferably about 15 to 0.5 weight percent) of a multiolefin of about 4 to 14, preferably about 4 to 6 carbon atoms. These are commonly referred to in patents and in technical literature as "butyl rubber," or GR–I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, dimethallyl, allo-ocymene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methyl styrene, alpha methyl styrene, indene, dihydronaphthalene, dichlorostyrene, p-chlorostyrene, mixtures thereof, etc. These copolymers have Staudinger molecular weights of between about 20,000 and 300,000, and mole percent unsaturations of between about 0.5 and 15.0.

The halogenated rubbery isoolefin-multiolefin-containing copolymers, particularly chlorinated or brominated butyl rubbers, are produced by carefully chlorinating and/or brominating the hydrocarbon copolymers in a manner which does not degrade the molecular weight thereof, as more fully described hereinafter. The resulting halogenated copolymers do not require sulfur or ultra-accelerators in their vulcanization and may be vulcanized solely by zinc oxide and/or primary or polyfunctional amines. The vulcanizates and covulcanizates with other rubbery polymers such as natural rubber and GR–S rubber have been found to exhibit good stress-strain properties and to have superior heat aging resistance compared to the corresponding unhalogenated copolymers. Since these halogenated copolymers already possess heat aging resistance superior to the unhalogenated copolymers, and the unhalogenated copolymers are not improved as to heat aging resistance by the addition thereto of the organic compounds containing

groups or liberating

groups hereinafter more fully described, and in fact tend to be gelled when such compounds are present, it is most unexpected that such derivatives have now been found to even further improve the gelation and heat-aging resistance of the halogenated copolymers.

In order to produce halogenated butyl rubber, the halogenation is regulated so that the resulting rubber will contain at least about 0.5 weight percent (preferably at least about 1.0 weight percent) combined halogen but not more than about "X" weight percent combined chlorine or 3.0 "X" weight percent combined bromine wherein:

$$X = \frac{M_3 L}{(100-L)M_1 + L(M_2 + M_3)} \times 100$$

and $L$ = mole percent of the multiolefin in the polymer
$M_1$ = molecular weight of the isoolefin
$M_2$ = molecular weight of the multiolefin
$M_3$ = atomic weight of chlorine or bromine Suitable halogenating agents which may be employed are gaseous chlorine, liquid bromine, alkali metal hypochlorites or hypobromites, $C_4$ to $C_{10}$ tertiary alkyl hypochlorites, sulfur bromides, sulfuryl chloride, pyridinium chloride perchloride, N-bromosuccinimide, alpha-chloroaceto-acetanilide, N,N'-dichloro-5,5-dimethylhydantoin, iodine halides, trichlorophenol chloride, N-chloroacetamide, beta-bromo-methyl phthalimide, etc. The preferred halogenating agents are gaseous chlorine, liquid bromine, sulfuryl chloride, sulfuryl bromide, chloro-hydantoins, bromo-hydantoins, iodine monochloride, and related materials.

The halogenation is generally conducted at temperatures of above about 0° to about 100° C., depending upon the particular halogenating agent, for about one minute to several hours. An advantageous pressure range is from about 0.1 to 1000 p.s.i.a., atmospheric pressure being satisfactory. The halogenation may be accomplished by preparing a 1 to 80 weight percent solution of such copolymers as above, in a substantially inert liquid organic solvent such as a $C_3$ to $C_{10}$ substantially inert hydrocarbon or halogenated derivatives of saturated hydrocarbons; e.g., hexane, mineral spirits, cyclohexane, benzene, chlorobenzene, chloroform, carbon tetrachloride, mixtures thereof, etc., and adding thereto the halogenating agent, which may optionally be in solution, such as dissolved in a substantially inert hydrocarbon, an alkyl chloride, carbon tetrachloride, carbon disulfide, etc. If chlorine gas is employed, it may also be diluted with up to about 50 times its volume, preferably about 0.1 to 5.0 times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried, preferably under about 1 to 760 millimeters or higher of mercury pressure absolute, at about 0° to 180° C., preferably about 50° to 150° C. (e.g. 70° C.). Other methods of recovering the chlorinated polymer are by conventional spray or drum drying techniques. Alternatively, the solution of the halogenated rubber may be injected into a vessel containing steam and/or agitated water heated to a temperature sufficient to volatilize the solvent and form an aqueous slurry of the chlorinated rubber. This halogenated rubber may then be separated from the slurry by filtration and drying or recovered as a "crumb" or as a dense sheet or slab by conventional hot milling and/or extruding procedures. As so produced, the halogenated rubbery copolymer has a Staudinger molecular weight within the range between approximately 20,000 to 300,000, preferably about 25,000 to 200,000, a mole percent unsaturation of about 0.5 to 15.0, and a combined halogen content of about 0.5 to 10.0 weight percent, preferably about 1.0 to 5.0 weight percent based on rubbery copolymer.

In practicing the present invention, the resulting unvulcanized halogenated isoolefin-multiolefin-containing copolymer, prior to compounding and curing, is blended at a temperature between about 0° and 200° C. with about 0.05 to 10.0, advantageously about 0.5 to 8.0, preferably about 1.0 to 5.0 weight percent of one or more of the organic compounds containing

group or liberating

groups in situ enumerated hereinafter. This may be accomplished in several manners. In a preferred embodiment of the invention substantially all of the organic stabilizing compound required is blended with the unvulcanized halogenated copolymer slurry just before or while the copolymer is recovered (i.e., precipitated and/or injected into a hot aqueous medium) but prior to the drying, milling and/or extruding steps. In another preferred embodiment, the organic stabilizing compound is added to the halogenated copolymer solution prior to recovering the copolymer by spray drying and/or drum drying and/or precipitation and/or injection into a hot aqueous medium. Alternatively, the organic stabilizing compound or compounds may be added on a cold mill or Banbury prior to compounding and vulcanization. However, it is especially desirable to blend with the halogenated copolymer at least 0.5 or 1.0 part, per hundred parts of copolymer, of at least one of the organic stabilizing compounds prior to such finishing operations as spray drying, drum drying, hot milling, extruding or calendering since the organic stabilizing compound substantially prevents dehydrohalogenation, cross linking or gelling and degradation or breakdown of the halogenated copolymer during these operations. Also, more of the stabilizer (e.g. about 0.5–5.0 weight percent based on copolymer) may be added subsequent to the foregoing finishing operations.

The organic stabilizing compounds containing or liberating

groups, employed in accordance with the present invention, may have boiling points between about 100° and 700° C. and are chosen from the three categories enumerated hereinafter, the members of all of which may be used singly or in combination:

(I) Di or tri $C_1$ to $C_{18}$ alkyl, alkaryl, aralkyl or especially aryl guanidines or $C_1$ to $C_{18}$ carboxylic acid salts of such guanidines examples of which are diphenyl guanidine, diorthotolylguanidine, dimethyl guanidine, triphenyl guanidine, diphenyl guanidine acetate, diphenyl guanidine oxalate, diphenyl guanidine phthalate, mixtures thereof, etc. It is preferred to use certain guanidines in amounts of at least about 1.0 weight percent based on halogenated copolymer.

(II) Thiazyl sulfenamides of the formulae:

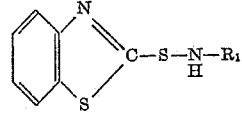

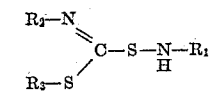

or

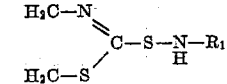

in which $R_1$, $R_2$, and $R_3$ are $C_1$ to $C_{18}$ alkyl, cycloalkyl, alkenyl, aryl, alkaryl, alkenaryl, aralkyl or aralkenyl groups. Typical thiazyl sulfenamides include benzothiazyl-2-monocyclohexyl sulfenamide or N-cyclohexyl-2-benzothiazole sulfenamide, N-tertiary butyl-2-benzothiazole sulfenamide, mixtures thereof, etc. It is preferred to use certain thiazyl sulfenamides in amounts of at least about 1.0 weight percent based on halogenated copolymer.

(III) Those organic stabilizing compounds which, under halogenated copolymer recovery conditions liberate

groups in situ, such as hexamethylene tetramine.

The foregoing compositions comprising halogenated isoolefin-multiolefin-containing copolymers and organic stabilizing compounds may be hot-milled, extruded, calendered or dried with facility, in accordance with conventional practice, without substantial dehydrohalogenation, gelation, or thermal degradation. One hundred parts by weight of these resulting compositions may also be compounded with about 10 to 150 parts by weight of a filler or fillers; about 1 to 30 parts by weight of zinc oxide and/or primary or polyfunctional amines and/or about 1 to 10 parts by weight of sulfur; plasticizers such as hydrocarbon oils, tars, waxes, resins or organic esters; pigments; magnesium oxide and/or calcium oxide; quinone dioxime or its derivatives or homologues; and accelerators such as mercapto-benzothiazole, benzothiazyl disulfide, etc. The compounded stock formed may then be vulcanized at temperatures between about 200° and 450° F., preferably about 250° to 400° F., for times between about a few seconds (e.g. 10 seconds) to several hours (e.g. 5 hours).

The stabilized, halogenated rubbery isoolefin-multiolefin copolymers may also be cured by zinc oxide and/or primary or polyfunctional amines in the presence of minor proportions of resinous polymerized hydroxy (or preferably ring alkylated hydroxy) aromatic (or heterocyclic) dialcohol compounds, particularly about 0.1 to 20, preferably about 0.5 to 10.0 weight percent of dimethylol phenolic resins such as 2,6-dimethylol-4-t-octyl phenol or the like. The foregoing dialcohol resins are produced by heating the monomeric phenol dialcohol at temperatures of between about 75° and 175° C. (e.g., 125° C.), care being taken to terminate the reaction while the resin is in the soluble (i.e., in organic solvents) and fusible state. The stabilized, halogenated butyl rubber may also be blended with about 0.5 to 10%, of a group II metal silicate, particularly calcium silicate, and/or with about 1 to 5% of an adsorbent deactivator such as various high boiling polar compounds, e.g., ethylene glycol, during or preferably before the halogenated butyl rubber is compounded and cured. Vulcanizates (or co-vulcanizates with natural or GR–S rubber) of this last-mentioned type are particularly useful in tires (especially in the carcass, undertread and bead areas), in tire casing curing bags or diaphragms, and in steam hose or similar articles. The vulcanization conditions for such compositions are generally as hereinbefore mentioned.

In order to more fully illustrate the present invention, the following experimental data are given.

CHLORINATED BUTYL RUBBER "A"

A copolymer containing about 97% isobutylene and 3% isoprene having a viscosity average molecular weight of 320,000 was dissolved in hexane to form a 10% solution. To this polymer solution, a 20 weight percent (based on the copolymer) of liquid sulfuryl chloride as the chlorinating agent was added and reacted for 30 minutes with the copolymer at room temperature. The resulting chlorinated interpolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

CHLORINATED RUBBERS "B" TO "L"

Other examples of halogenated isoolefin-multiolefin copolymers which can be used are tabulated hereinafter, the amount of isoolefin and multiolefin in the copolymer, halogenation agent, and amount of halogen combined in the copolymer being as follows:

rubber was agitated for an additional 10 minutes. This solution was then water washed three times to remove dissolved hydrogen chloride. The amount of butyl rubber, benzene solvent and gaseous chlorine added, as well as the calculated percent of added chlorine based on polymer and resulting percent of chlorine combined in the polymer were as follows:

|  | Pounds | Composition of chlorinated product |
|---|---|---|
| Butyl rubber | 170 | 98.72 |
| Benzene solvent | 1,540 | |
| Chlorine | [1] 4.8 | 1.28 |

[1] I.e. 2.8%.

The resulting water-washed benzene solution containing chlorinated rubbery butyl rubber "M" was then recovered by injecting the same into approximately 40 volumes of an agitated aqueous solution containing a commercial wetting agent of the aliphatic polyoxyethylene ether type (Sterox A. J.) in an amount of 0.6 pound per 100 pounds of chlorinated rubber as a dispersing aid. The agitated dispersion was maintained at a temperature between about 190° and 210° F. (e.g., 200° F.) whereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e., 82° C.) and dried for ten hours. The crum depth on the tray was about ½ inch. The crumb was then completely dried and compacted by milling for 10 min-

| Halogenated Rubber | Isoolefin (Percent) [1] | Multiolefin (Percent) [1] | Halogenation Agent | Percent Halogen in the Rubber [1] |
|---|---|---|---|---|
| B | Isobutylene (98) | Isoprene (2) | $SO_2Cl_2$ | 1.2 chlorine. |
| C | Isobutylene (95) | Isoprene (5.0) | $Cl_2$ in $CCl_4$ | 2.5 chlorine. |
| D | Isobutylene (94) | Cyclopentadiene (6) | $Cl_2$ in $CCl_4$ | 2.0 chlorine. |
| E | Isobutylene (92) | Myrcene (8.0) | $Cl_2$ in $CCl_4$ | 1.6 chlorine. |
| F | 2-methylbutene-1 (95) | Isoprene (5) | $Cl_2$ in $CCl_4$ | 1.3 chlorine. |
| G | 3-methylbutene-1 (96) | Butadiene (4) | $Cl_2$ in $CCl_4$ | 1.7 chlorine. |
| H | Isobutylene (98) | 1-vinyl cyclohexene-3 (2) | $Cl_2$ in $CCl_4$ | 0.8 chlorine. |
| I | Isobutylene (92) | Butadiene (8) | $Cl_2$ | 2.8 chlorine. |
| J | Isobutylene (85) | Isoprene (15) | $Cl_2$ | 6.6 chlorine. |
| K | Isobutylene (98) | Isoprene (2) | N-N'-dichloro-5,5-dimethyl hydantoin. | 1.1 chlorine. |
| L | Isobutylene (98) | Isoprene (2) | Liquid bromine | 2.3 bromine. |

[1] Note: Percent in all instances is percent by weight.

CHLORINATED BUTYL RUBBER "M"

An additional run was made with a commercial butyl rubber corresponding to GR–I–25 butyl rubber dissolved in about 9 volumes of benzene. The butyl rubber had a Mooney viscosity at 212° F. for 8 minutes of 43, and a mole percent unsaturation of 2.3. The chlorination was conducted in a 500-gallon glass-lined Pfaudler reactor equipped with an agitator, baffle, submersed stainless steel sparger ring and a conduit leading into the ring.

Gaseous chlorine was continuously added to the butyl rubber solution over a period of ½ hour at a temperature level of 30° C. and at atmospheric pressure. The chlorine was added to the reactor through the conduit via the sparger ring. The chlorination was then terminated and the solution containing the resulting chlorinated butyl utes on a conventional rubber mill having a roll temperature of 260° F. (i.e. 127° C.)

Example

One hundred parts by weight of chlorinated butyl rubber "M" were compounded on a cold mill (e.g. 20° C.) with 1.0 part by weight of the stabilizers indicated hereinafter. Portions of the respective blends were placed on tin plate and aged for 30 minutes in a circulating air oven at 297° F. HCl evolution was evidenced by corrosion of the tinplate and gelation was evidenced by incomplete solubility in hexane compared to a control of chlorinated butyl rubber "M" containing no added stabilizer. All samples were also tested for chlorine content after the above oven heat aging. The results were as follows:

| Stabilizer | Aged | Tin plate corrosion | Solubility in hexane | Weight Percent Chlorine |
|---|---|---|---|---|
| None (i.e., control) | No | None | Soluble | 1.28 |
| None (i.e., control) | Yes | Severe | Insoluble | 0.67 |
| Diphenyl guanidine | Yes | None | Soluble | 1.27 |
| *Benzothiazyl-2-monocyclohexyl sulfenamide.[1] | Yes | None | Soluble | 1.28 |
| Hexamethylene tetramine | Yes | None | Soluble | 1.28 |

[1] (I.e., N-cyclohexyl-2-benzothiazole sulfenamide.)

The above data show that organic compounds containing

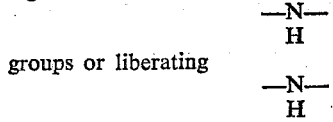

groups or liberating

—N—
H groups at 297° F. stabilize chlorinated butyl rubber against dehydrohalogenation and gelation in accordance with the present invention.

One hundred parts by weight of each unaged stabilized chlorinated butyl rubber were compounded on a cold rubber mill with 2.0 parts by weight of sulfur, 50 parts by weight of SRF carbon black, 5 parts by weight of zinc oxide, 1.0 part by weight of tellurium diethyl dithiocarbamate, and 1.0 part by weight of stearic acid, and compared to an unaged control containing no added stabilizer, also compounded in the same manner. The physical inspections of the respective vulcanizates cured at 307° F. for 60 minutes containing the following stabilizers were as tabulated:

| Property | Stabilizer | | | |
| --- | --- | --- | --- | --- |
| | None (i.e. control) | Diphenyl Guanidine | Benzothiazyl-2-monocyclohexyl Sulfenamide | Hexamethylene tetramine |
| Tensile strength (p.s.i.) | 1,890 | 1,740 | 1,800 | 2,115 |
| Mod il is at 300% Elongation (p.s.i.) | 1,340 | 1,410 | 1,350 | 1,970 |
| Elongation (Percent) | 440 | 595 | 445 | 325 |

The above data show that the presence of the organic stabilizing compounds of the present invention does not preclude effective vulcanization.

Resort may be had to various modifications and variations of the disclosed specific embodiments without departing from the spirit of the invention or the scope of the appended claims.

What is claimed is:

1. In a process for preparing a copolymer of 85 to 99.5% of a $C_4$ to $C_8$ isoolefin with 15 to 0.5% of a $C_4$ to $C_{14}$ multiolefin containing at least about 0.5 weight percent of combined halogen in its structure which has been recovered from a water slurry; the improvement which comprises blending said copolymer with 0.05 to 10.0 wt. percent of an organic compound containing an —NH— group selected from the group consisting of N - cyclohexyl - 2 - benzothiazole sulfenamide, diphenyl guanidine, and hexamethylene tetramine prior to recovery from said slurry to provide a copolymer therefrom stabilized against gelation; said stabilized halogenated copolymer being capable of being subsequently compounded and cured.

2. In a process for preparing a copolymer of 85 to 99.5% isobutylene with 15 to 0.5% isoprene containing at least about 0.5 wt. percent of combined chlorine in its structure which has been recovered from a water slurry; the improvement which comprises blending said polymer with 0.05 to 10.0 wt. percent of benzothiozyl-2-monocyclohexyl sulfenamide prior to recovery from said slurry to provide a copolymer therefrom stabilized against gelation; said stabilized chlorinated copolymer being capable of being subsequently compounded and cured.

3. A composition stabilized against gelation which comprises a halogenated copolymer of 85 to 99.5% of a $C_4$ to $C_8$ isoolefin with 15 to 0.5% of a $C_4$ to $C_{14}$ multiolefin which has been recovered from a water slurry; said copolymer containing at least 0.5 wt. percent of combined halogen in its structure; said halogenated copolymer having been blended with 0.05 to 10.0 wt. percent of an organic compound containing an —NH— group selected from the group consisting of N-cyclo-2-benzothiazole sulfenamide, diphenyl guanidine, and hexamethylene tetramine prior to recovery from said slurry; said stabilized copolymer being capable of being subsequently compounded and cured.

4. A composition stabilized against gelation which comprises a halogenated copolymer of 85 to 99.5% isobutylene with 15 to 0.5% isoprene which has been recovered from a water slurry; said copolymer containing at least 0.5 wt. percent of combined halogen in its structure; said halogenated copolymer having been blended with 0.05 to 10.0 wt. percent of benzothiozyl--2-monocyclohexyl sulfenamide prior to recovery from said slurry; said stabilized copolymer being capable of being subsequently compounded and cured.

5. A composition according to claim 3 in which the halogenated copolymer contains at least about 0.5 weight percent chlorine but not more than about one atom of chlorine per double bond in the copolymer.

6. A composition according to claim 3 in which the halogenated copolymer contains at least about 0.5 weight percent bromine but not more than about three combined atoms of bromine per double bond in the copolymer.

7. A composition according to claim 3 in which the organic stabilizing compound is benzothiazyl-2-monocyclohexyl sulfenamide.

8. A composition according to claim 3 in which the organic stabilizing compound is hexamethylene tetramine.

9. A composition according to claim 3 in which the stabilizer is diphenyl guanidine.

References Cited in the file of this patent

UNITED STATES PATENTS

| 2,631,984 | Crawford | Mar. 17, 1953 |
| 2,698,041 | Morrissey et al. | Dec. 28, 1954 |
| 2,720,479 | Crawford et al. | Oct. 11, 1955 |
| 2,732,354 | Morrissey et al. | Jan. 24, 1956 |
| 2,809,372 | Frederick et al. | Oct. 8, 1957 |
| 2,868,764 | Hirsty | Jan. 13, 1959 |